(12) United States Patent
Caveney

(10) Patent No.: US 7,773,850 B2
(45) Date of Patent: Aug. 10, 2010

(54) CABLE SLACK MANAGER

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/684,902

(22) Filed: Mar. 12, 2007

(65) Prior Publication Data

US 2007/0212010 A1  Sep. 13, 2007

Related U.S. Application Data

(60) Provisional application No. 60/781,847, filed on Mar. 13, 2006.

(51) Int. Cl.
*G02B 6/00* (2006.01)
(52) U.S. Cl. .................... 385/135; 385/134
(58) Field of Classification Search ............. 385/135, 385/134, 137
See application file for complete search history.

(56) References Cited

U.S. PATENT DOCUMENTS

| | | | |
|---|---|---|---|
| 4,824,196 A | 4/1989 | Bylander | |
| 5,066,149 A | 11/1991 | Wheeler et al. | |
| 5,100,221 A | 3/1992 | Carney et al. | |
| 5,285,515 A | 2/1994 | Milanowski et al. | |
| 5,402,515 A | 3/1995 | Vidacovich et al. | |
| 5,740,299 A | 4/1998 | Llewellyn et al. | |
| 5,778,131 A | 7/1998 | Llewellyn et al. | |
| 5,894,540 A | 4/1999 | Drewing | |
| 5,946,440 A * | 8/1999 | Puetz | 385/135 |
| 6,081,645 A | 6/2000 | Dotzer et al. | |
| 6,263,141 B1 * | 7/2001 | Smith | 385/135 |
| 6,278,830 B1 | 8/2001 | Levesque et al. | |
| 6,282,360 B1 | 8/2001 | Milanowski et al. | |
| 6,356,697 B1 | 3/2002 | Braga et al. | |
| 6,571,047 B1 | 5/2003 | Yarkosky et al. | |
| 6,603,918 B2 | 8/2003 | Daoud et al. | |
| 6,711,338 B2 | 3/2004 | Lin et al. | |
| 6,715,619 B2 | 4/2004 | Kim et al. | |
| 6,748,155 B2 | 6/2004 | Kim et al. | |
| 6,763,171 B2 | 7/2004 | D'Inca | |
| 6,772,887 B2 | 8/2004 | Audibert et al. | |
| 6,819,857 B2 | 11/2004 | Douglas et al. | |
| 6,845,207 B2 | 1/2005 | Schray | |
| 6,865,331 B2 | 3/2005 | Mertesdorf | |
| 6,925,241 B2 | 8/2005 | Bohle et al. | |
| 6,944,383 B1 | 9/2005 | Herzog et al. | |
| 2005/0276561 A1 | 12/2005 | Aziz et al. | |

FOREIGN PATENT DOCUMENTS

GB  2241221 A  8/1991

\* cited by examiner

*Primary Examiner*—Uyen-Chau N Le
*Assistant Examiner*—Kajli Prince
(74) *Attorney, Agent, or Firm*—Robert A. McCann; Christopher S. Clancy

(57) ABSTRACT

A cable slack manager for managing cable slack comprises two or more spaced apart cable management members rotatable between a first stored position and a second deployed position. At least one arm releasably securable to a cable management assembly (e.g., a rack or data cabinet) may carry the two or more spaced apart cable management members, which may exhibit a round or C-shaped configuration. The cable slack manager may optionally comprise a base mountable to the cable management assembly, with the at least arm securable to the base.

31 Claims, 7 Drawing Sheets

CABLE SLACK MANAGER

FIELD OF INVENTION

This invention relates to a cable slack manager and, more particularly, to a cable slack manager used to manage cable slack in cable management assemblies.

BACKGROUND

Typical cable management solutions include various structures for retaining and controlling patch cords. Patch cords are available in various discrete lengths. However, typical installations result in cable slack, which is undesirable.

There is a need, therefore, for a cable manager that routes and stores cable slack in an organized way.

SUMMARY OF THE INVENTION

The present invention relates to an improved cable slack manager for use with a cable management assembly. The term cable management assembly, as used herein, includes, but is not limited to, racks and data cabinets. Typically, the cable slack manager is dimensioned to occupy no more than one rack mounting unit on the cable management assembly.

In one embodiment, the cable slack manager comprises two or more spaced apart cable slack management members and a hinge for rotatably securing the two or more spaced apart cable slack management members to the cable management assembly. The two or more cable slack management members of this embodiment comprise first and second forward facing surfaces spaced apart and connected by a curvilinear surface, with an open space defined between the first and second forward facing surfaces and the curvilinear surface. In addition, the two or more spaced apart cable slack management members are rotatable between a first position and a second position. The first position may be a stored position, with the cable slack management members inaccessible to a user and the second position may be a deployed position, with the cable slack management members accessible to the user. The hinge enables rotation of the two or more spaced apart cable slack management members from the first position to the second position.

In another embodiment, the cable slack manager comprises at least one arm carrying two or more spaced apart cable slack management members, a hinge rotatably securing the at least one arm to the cable slack manager and a guide comprising opposing guide members defining an opening therebetween. The two or more spaced apart cable slack management members define openings between adjacent slack management members for receiving cable slack. The hinge comprises an axis of rotation transverse to the at least one arm. Each guide member comprises a first end and a second end, with the axis of rotation extending between the first and second ends.

In yet another embodiment, the cable slack manager comprises at least one arm rotatably secured to the cable management assembly, a leading slack management member and two or more successively spaced C-shaped trailing slack management members defining openings between adjacent cable slack management members. The leading slack management member is positioned on the at least one arm and comprises a rounded portion extending circumferentially about 360 degrees. The at least one arm is rotatable between a first position and a second position about an axis of rotation transverse to the at least one arm. The C-shaped trailing slack management members are positioned on the at least one arm in spaced apart relation to the leading slack management member, and the leading slack management member is positioned closer to the hinge than the trailing slack management members. The C-shaped trailing management members may be positioned along a longitudinal axis running the length of the at least one arm.

The above-described cable slack managers may incorporate various additional features. Each cable slack management member may, for example, comprise a top surface overhanging the entirety of the curvilinear surface. The at least one arm may comprise opposing arms dimensioned so that each arm can rotate without contacting the other. The opposing arms may be positioned such that each arm rotates in opposite directions, with one arm rotating in a clockwise direction and the other arm rotating in a counterclockwise direction upon rotation into the deployed position. The hinge may take various forms, such as a pin within an aperture. The opposing guide members may comprise curvilinear surfaces for providing bend radius control. Depending on their positioning, the guide members may help to limit translational movement of cable slack to between about 0.05 inches to about 0.5 inches upon rotation of the at least one arm. When the cable slack management assembly comprises a patch panel, the cable slack management members may rotate beyond a front face of the patch panel. The cable slack manager may further comprise a base mountable to the cable management assembly, the base for carrying the at least one arm.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should also be understood, of course, that the invention is not necessarily limited to the particular embodiments illustrated herein.

DETAILED DESCRIPTION

Figure 1:
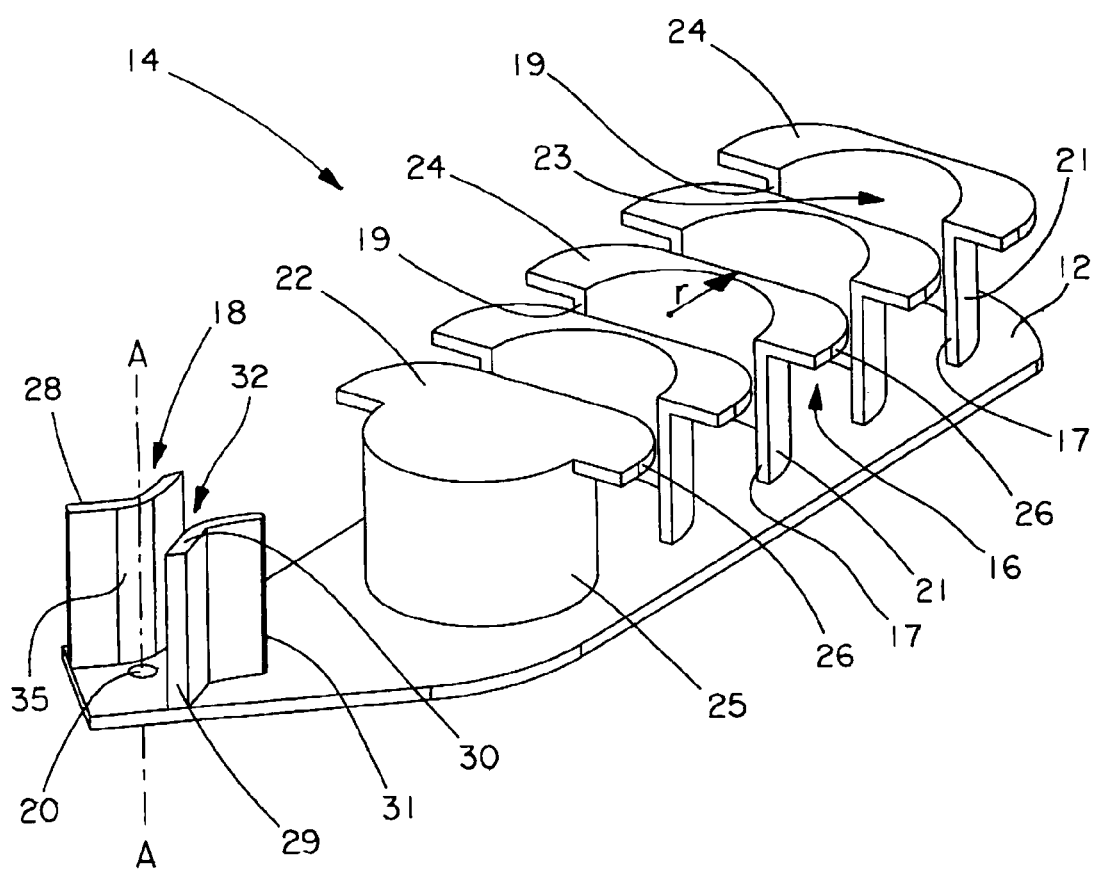
FIG. 1 is a perspective view of a rotatable arm of the cable slack manager of the present invention.

Referring now to FIGS. 1-3B, one embodiment of the cable slack manager 10 of the present invention is shown. Manager 10 may comprise rotatable arm 12 pivotally secured to base plate 13. As shown in FIG. 1, arm 12 comprises slack management assembly 14. Arm 12 may further comprise cable guide 18 and aperture 20 for receiving a pin to create hinge 15 for facilitating rotation.

Figure 5:
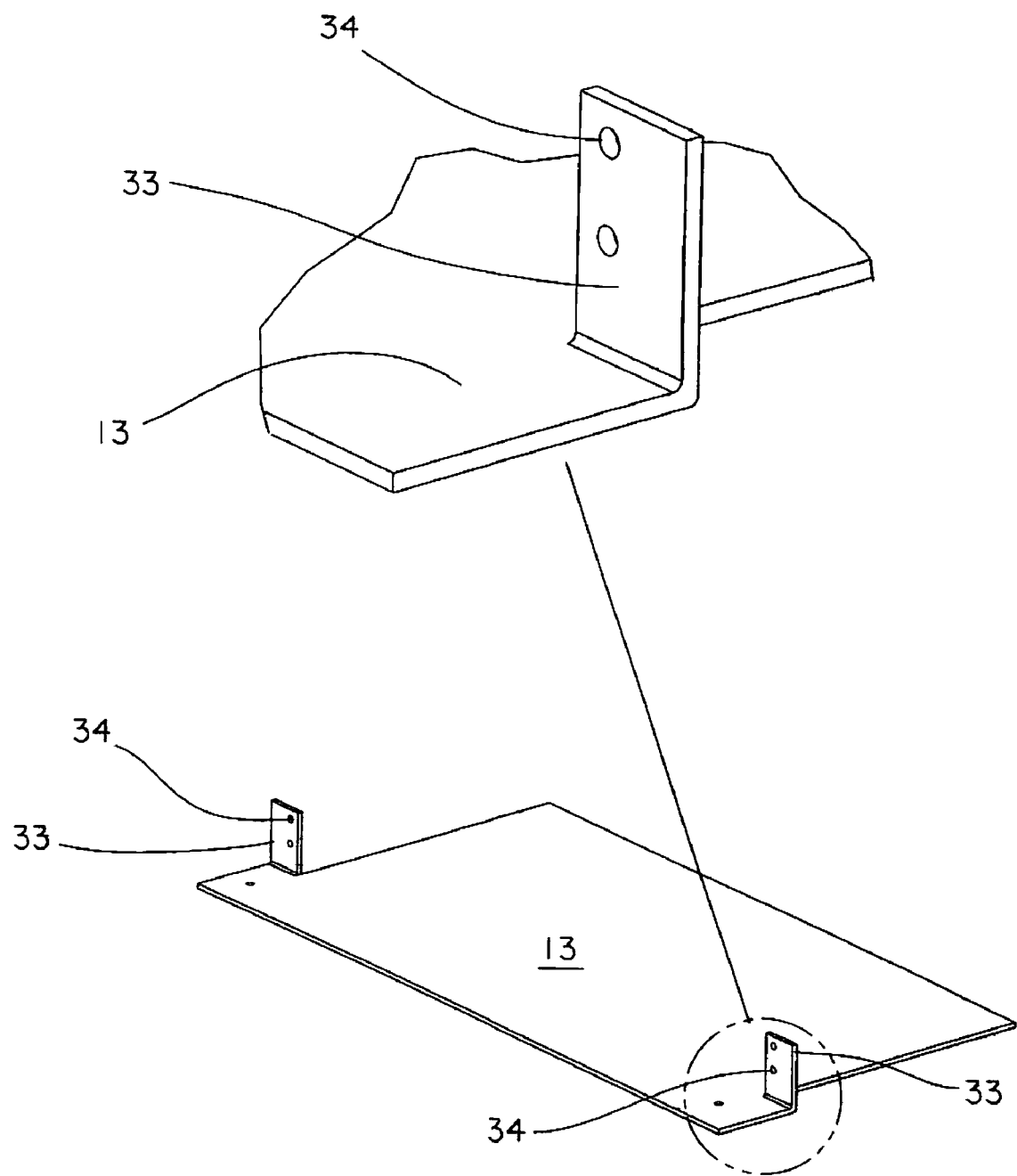
FIG. 5 is a perspective view of the base plate of the cable slack manager of the present invention, with a detail showing the mounting flange.

Arm 12 may be rotatably secured to base plate 13 through hinge 15 and rotatable between a first position and a second position about an axis of rotation A transverse to arm 12. Base plate 13 comprises a longitudinally extending pin (not shown), which may be positioned within aperture 20 of arm 12 to create hinge 15 about which arm 12 may rotate. Base plate 13 may further comprise opposing mounting flanges 33, each of which comprises aperture 34 that mates with an aperture positioned within the rail of a cable management assembly, such as a rack or data cabinet. Mounting flanges 33 are best seen in FIG. 5.

As shown, in FIGS. 1, 2B, 3B and 4, slack management assembly 14 comprises leading slack management member 22 and a plurality of successively spaced apart C-shaped trailing slack management members 24. Leading slack management member 22 may extend circumferentially about 360 degrees. Trailing slack management members 24, which may extend circumferentially about 180 degrees, define openings 16 between adjacent cable slack management members, with cable slack extendable through the openings and windable about trailing slack management members 24. Trailing slack management members 24 may comprise first and second forward facing surfaces 17 and 19 spaced apart and connected by a curvilinear surface 21, with an open space 23 defined between first and second forward facing surfaces 17 and 19 and curvilinear surface 21. Both leading slack management member 22 and C-shaped trailing slack management members 24 are positioned on arm 12, with leading slack management member 22 positioned closer to hinge 15 than trailing slack management members 24. Trailing slack management members 24 are typically positioned along a longitudinal axis L of arm 12.

Each of leading slack management member 22 and trailing slack managers 24 may comprise rounded portion 25 for winding cable around them and top overhanging portion 26 for retaining cable slack thereon. The use of rounded portion 25 provides bend radius control. Other configurations such as oval may, of course, be employed.

The dimensions of slack management assembly 14 may vary. Radius r of slack management assembly 14 may be between about 0.75 inches to about 1.25 inches, with 1.0 inch being typical. The distance between successive slack managers may be between about 0.25 and about 0.50 inches, with about 0.40 being typical.

Cable guide 18 may comprise opposing guide members 28 and 30 defining opening 32 therebetween. Cables may enter and exit through opening 32. Each guide member 28 and 30 comprises first end 29 and second end 31 with curvilinear surface 35 interposed therebetween. Curvilinear surface 35 provides bend radius control. Axis of rotation A is positioned between the first end and second ends.

Cable slack manager 10 may be formed as separate pieces and assembled. Arm 12 and base plate 13 may be separately stamped from metal, while slack management members 22 and 24 may be individually molded out of plastic. Slack management members 22 and 24 may be affixed to arm 12 through rivets, adhesive and/or other suitable means known to those skilled in the art.

FIGS. 2A-3B illustrate use of cable manager 10 in rack 36. Typically, manager 10 comprises opposing arms 12 each of which is rotatably secured to base plate 13 which, in turn, is mounted to rack 36 through mounting flanges 33. Arms 12 may be dimensioned so that each arm 12 can rotate freely without contacting the other and positioned such that each arm rotates in opposite directions during rotation, with one arm rotating in a clockwise direction and the other arm rotating in a counterclockwise direction upon rotation into the deployed position. Arms 12 are typically between about 7.0 inches and about 11.0 inches in length, with about 10.0 inches being typical. Rack 36 comprises opposing rails 38 and 40, and patch panel 42 is mounted to rails 38 and 40. Cable path 44 (see FIG. 4) runs along the sides of slack management assembly 14, adjacent cable management fingers 46.

Figure 2A:
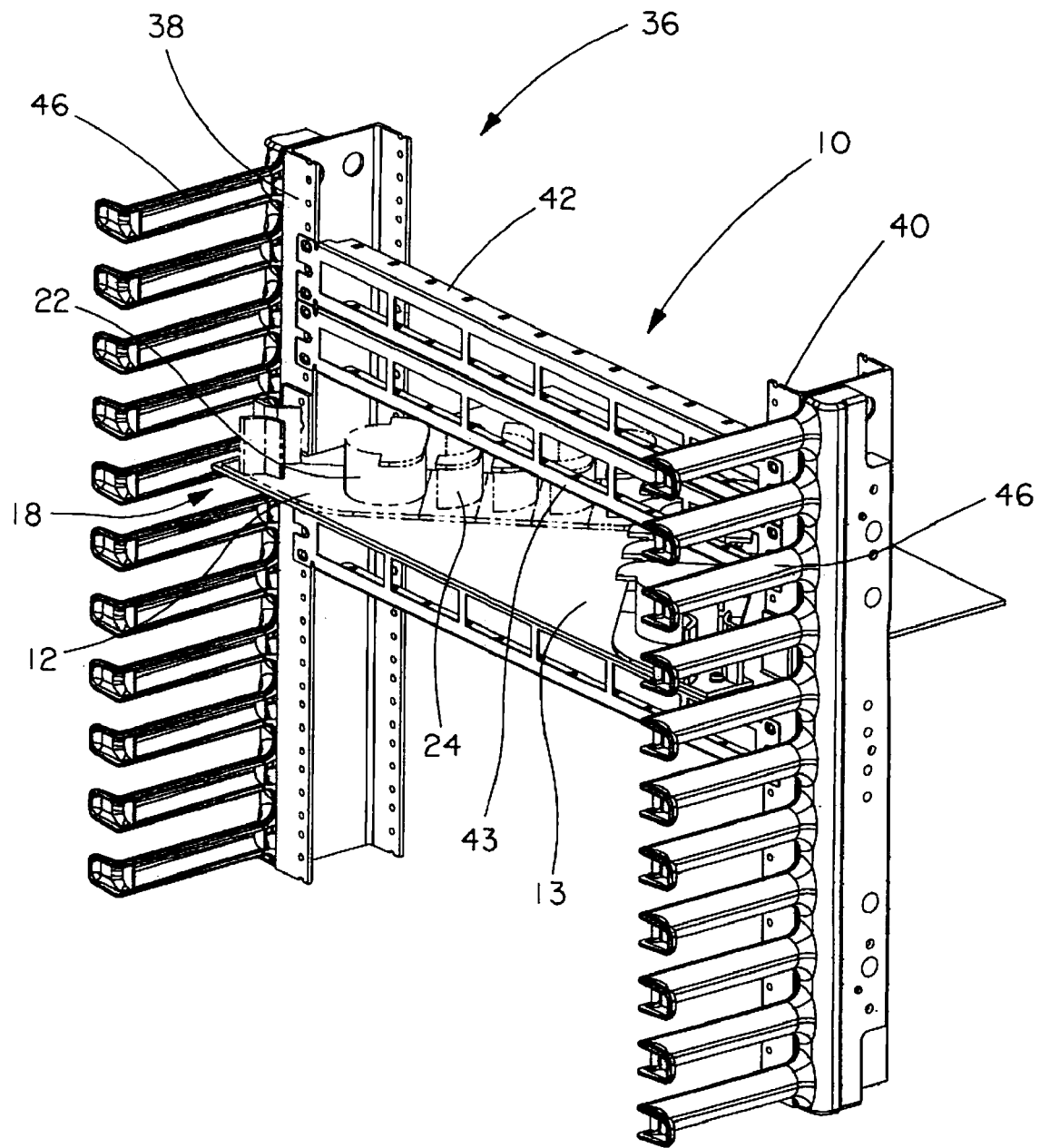
FIG. 2A is a front perspective view of the cable slack manager of the present invention mounted to a rack.
Figure 2B:
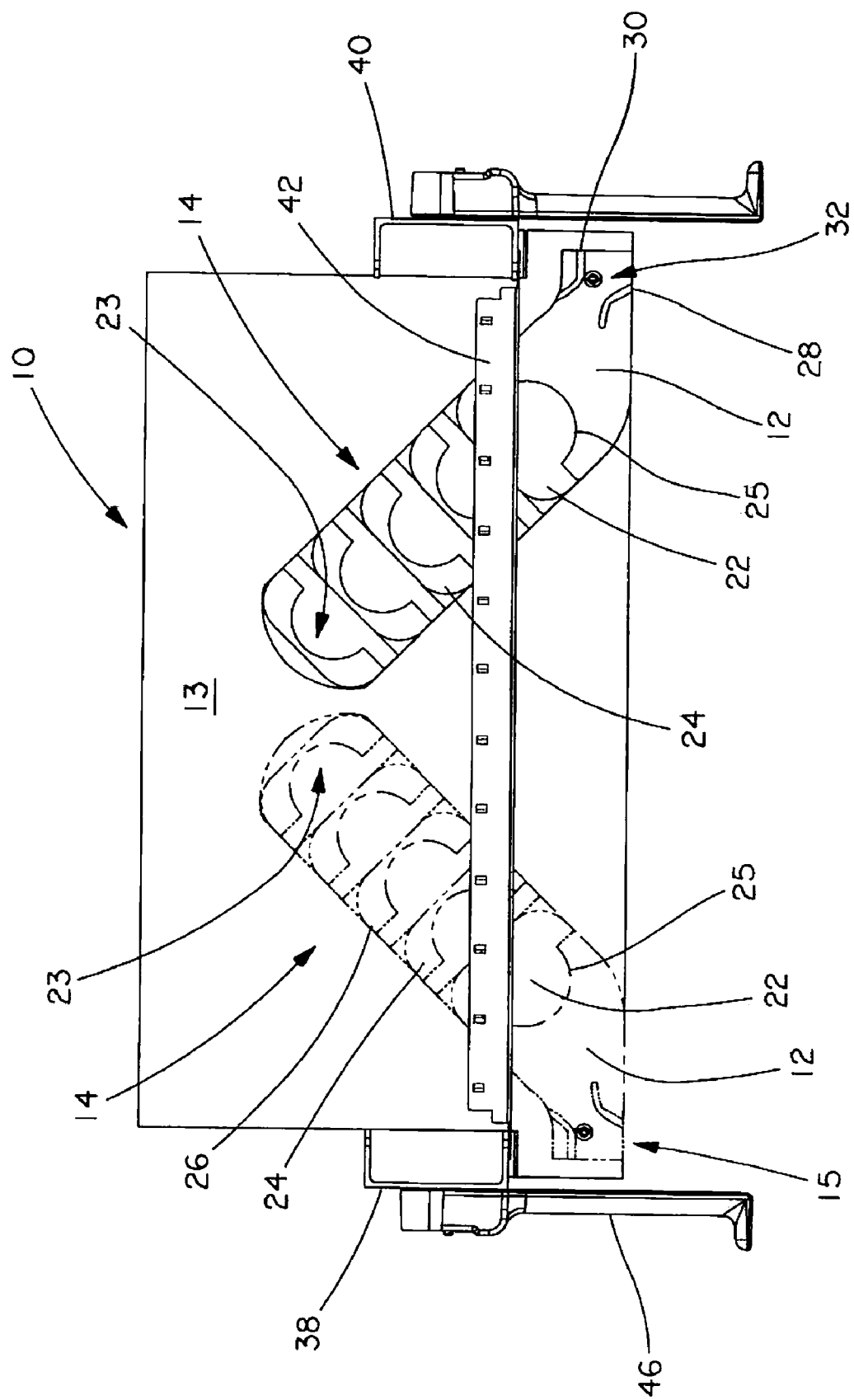
FIG. 2B is a top plan view of FIG. 2A, with a portion of the patch panel removed.
Figure 3A:
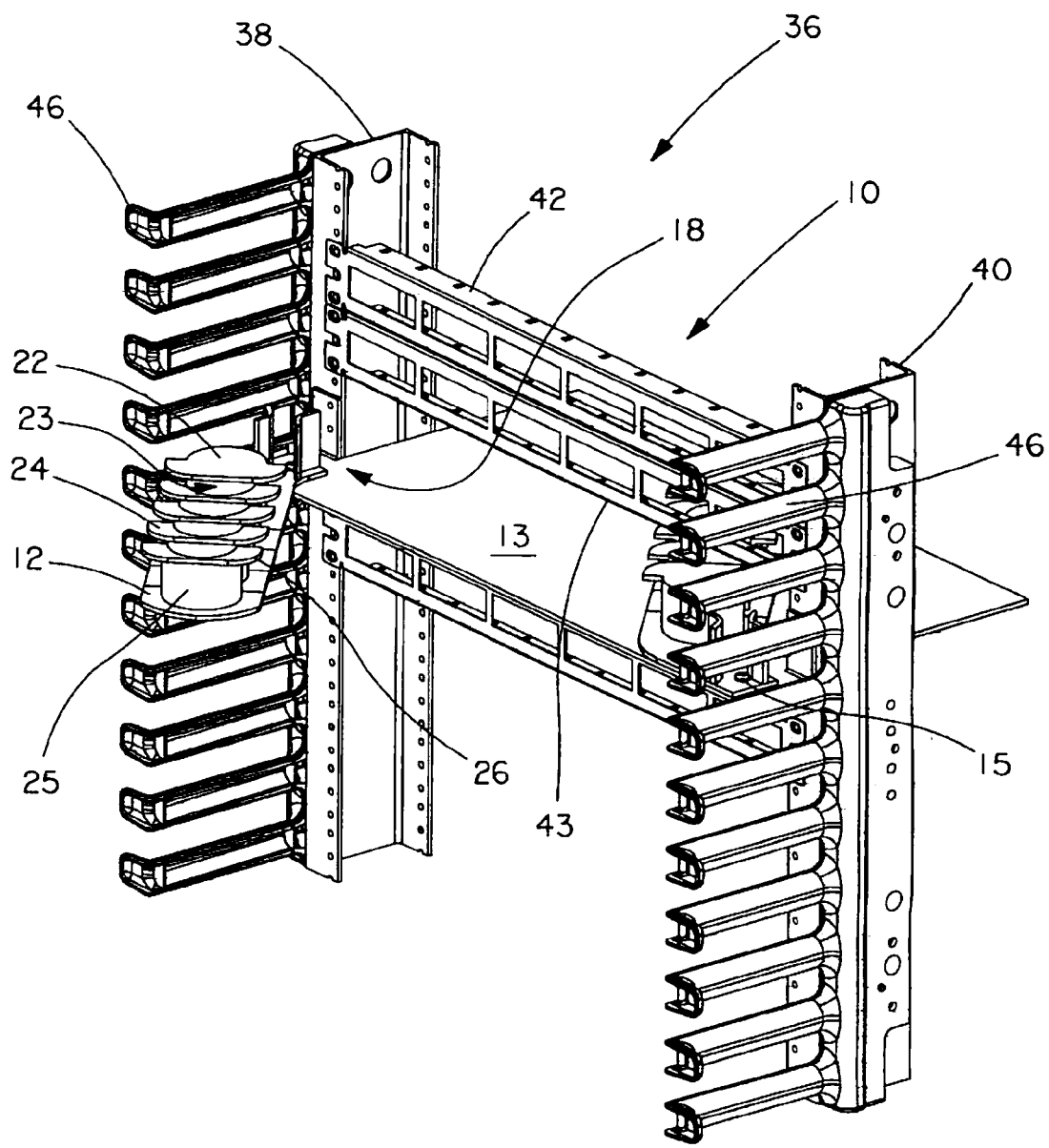
FIG. 3A is a front perspective view of FIG. 2A, with one of the arms of the cable slack manager rotated outwardly from the rack.
Figure 3B:
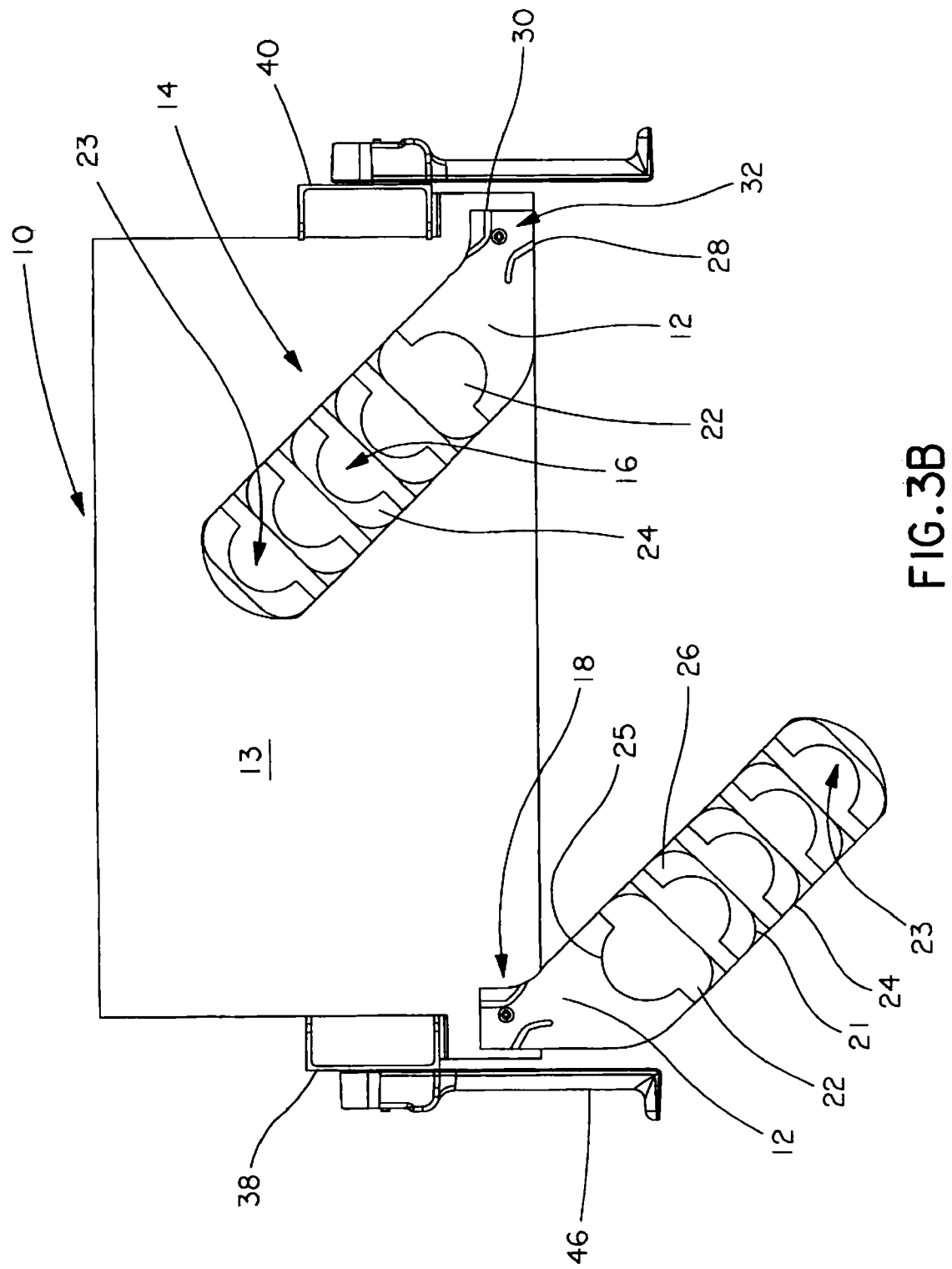
FIG. 3B is a top plan view of FIG. 3A, with the patch panel removed.

Operation is stepwise. Arms 12 begin in a first stored position, seen in FIGS. 2A and 2B. Each arm 12 may be separately rotated so two or more slack management assemblies 14 are positioned beyond front face 43 of patch panel 42, thereby placing slack management assemblies 14 in a second deployed condition for use, is shown in FIGS. 3A and 3B. Most often, arms 12 are rotated about 90°. Cable may then be threaded through opening 32 of cable guide 18, wrapped around one of slack management members 22 or 24 and threaded back through opening 32.

Figure 4:
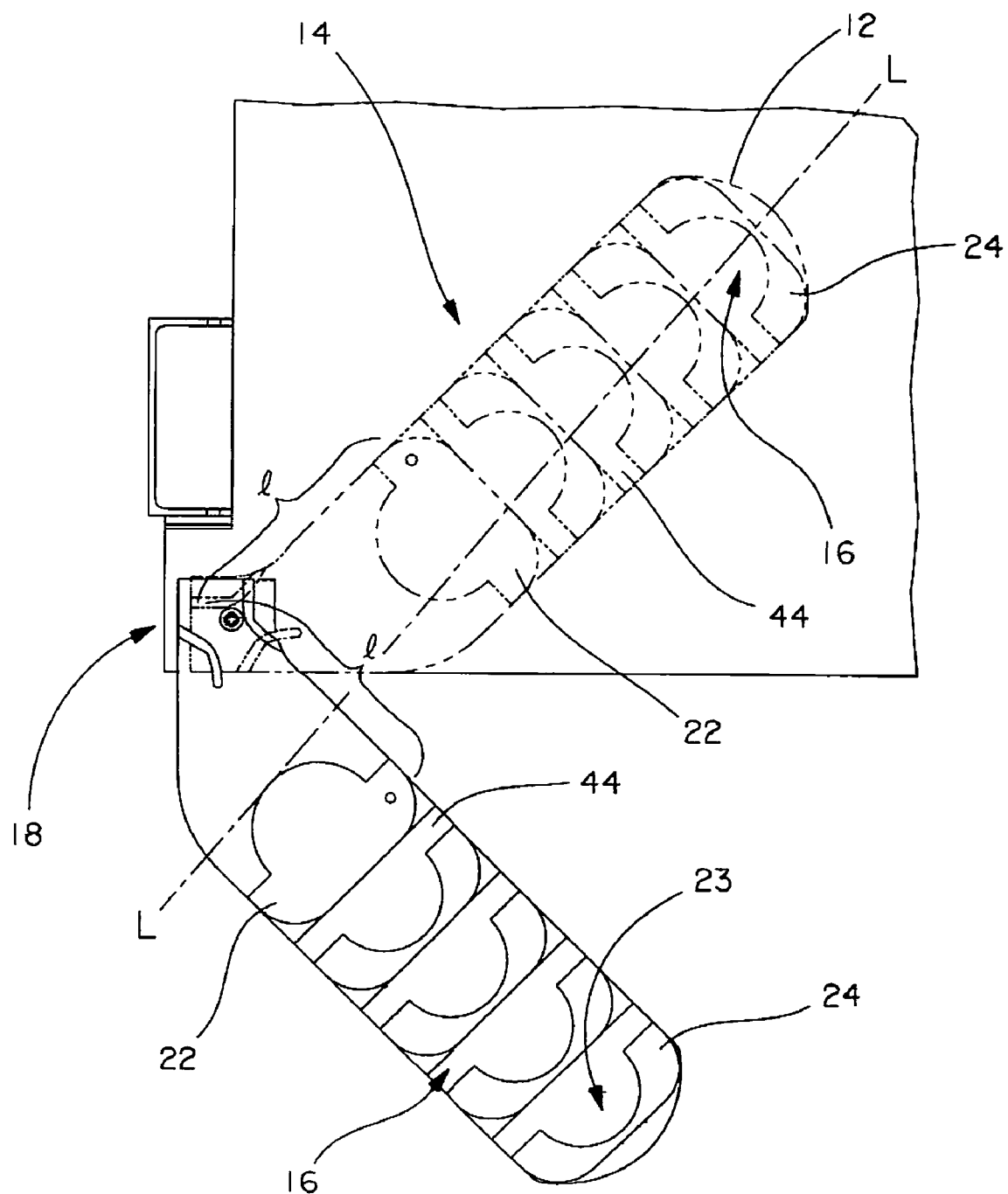
FIG. 4 is a top plan view of FIG. 1, showing rotation of a rotatable arm from a stored to a deployed position.

The rotatability of arms 12 provides certain advantages. Because arms 12 may be rotated beyond front face 43 of patch panel 42, accessability is provided while utilizing minimum space. As shown in FIGS. 2A and 3A, manager 10 could occupy as little as one rack space. Depending on the number and size of cables to be managed, however, manager 10 may be modified to occupy two or more rack spaces. Additionally, positioning cable guide 18 at or near the axis of rotation of arm 12 substantially prevents translational movement of cable during rotation of arm 12. Referring to FIG. 4, rotation of arm 12 only slightly changes the length l of cable positioned about slack management assembly 14. This slight translational movement of cable is on the order of between about 0.05 inches to about 0.50 inches and, more specifically, between about 0.10 inches to about 0.29 inches.

While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation. The actual scope of the invention is intended to be defined in the following claims.

The invention claimed is:

1. A cable slack manager for use with a cable management assembly, the cable slack manager comprising:
   at least one arm comprising first and second portions, said first portion defined by opposing external edges of said at least one arm and comprising a length dimension and a width dimension, said length dimension greater than said width dimension and said width dimension extending between said opposing external edges, said opposing external edges positioned in a parallel relationship and bisected by a longitudinal axis, said second portion extending from said first portion at an angle obtuse to said longitudinal axis;
   two or more spaced apart cable slack management members positioned along said longitudinal axis of said first portion and extending across substantially the entire width dimension of said first portion, the two or more spaced apart cable slack management members each comprising a rear surface and first and second forward facing surfaces, the first and second forward facing surfaces spaced apart and connected by a curvilinear surface with an open space defined between the first and second forward facing surfaces and the curvilinear surface, wherein the curvilinear surface and the rear surface define a constant thickness therebetween to thereby define a core out and wherein the cable slack manager is rotatable between a first position and a second position; and
   a hinge positioned on said second portion for rotatably securing the at least one arm to the cable management assembly, the hinge enabling rotation of the at least one arm from the first position to the second position.

2. The cable slack manager of claim 1, further comprising a guide comprising opposing guide members defining an opening therebetween, each guide member comprising a first end and a second end, with an axis of rotation of the hinge extending between the first and second ends, the opening for receiving cable slack.

3. The cable slack manager of claim 1, wherein the two or more spaced apart cable management members comprise a leading slack management member comprising a rounded portion and extending circumferentially about 360 degrees and two or more successively spaced trailing slack management members, each extending circumferentially about 180 degrees, wherein the leading slack management member is positioned closer to the hinge than the trailing slack management members and the leading and trailing slack management members are each positioned along the longitudinal axis.

4. The cable slack manager of claim 1, wherein the first position is a stored position, with the cable slack management members inaccessible to a user and the second position is a deployed position, with the cable slack management members accessible to the user.

5. The cable slack manager of claim 1, wherein the hinge comprises a pin positionable within an aperture.

6. The cable slack manager of claim 1, wherein the cable management assembly comprises a patch panel and the cable slack management members are positioned beyond a front face of the patch panel when the cable slack manager is in the second position.

7. The cable slack manager of claim 1, wherein the cable slack manager is dimensioned to occupy no more than one rack mounting unit on the cable management assembly.

8. The cable slack manager of claim 1, further comprising a base mountable to the cable management assembly, the base for carrying the at least one arm.

9. The cable slack manager of claim 1, further comprising a guide comprising opposing guide members defining an opening therebetween for receiving and guiding cable slack, the guide positioned near the hinge.

10. A cable slack manager for use with a cable management assembly, the cable slack manager comprising:
  at least one arm comprising first and second portions, said first portion defined by opposing external edges of said at least one arm and comprising a length dimension and a width dimension, said length dimension greater than said width dimension and said width dimension extending between said opposing external edges, said opposing external edges positioned in a parallel relationship and bisected by a longitudinal axis;
  two or more spaced apart cable slack management members positioned along said longitudinal axis of said first portion of said at least one arm and extending across substantially the entire width dimension of said first portion, the two or more spaced apart cable slack management members defining openings between adjacent slack management members for receiving cable slack;
  a hinge positioned on said second portion of said at least one arm, said hinge rotatably securing the at least one arm to the cable slack manager, the hinge comprising an axis of rotation transverse to the at least one arm; and
  a guide positioned on said second portion of said at least one arm, said guide comprising opposing guide members defining an opening therebetween, each guide member comprising a first end and a second end and the axis of rotation extending between the first and second ends, the opening for receiving cable slack.

11. The cable slack manager of claim 10 comprising opposing arms dimensioned so that each arm can rotate without contacting the other.

12. The cable slack manager of claim 10, wherein the at least one arm is rotatable between a stored position, with the two or more cable slack management members inaccessible to a user and a deployed position, with the two or more cable slack management members accessible to the user.

13. The cable slack manager of claim 12 comprising opposing arms positioned such that each arm rotates in opposite directions during rotation, with one arm rotating in a clockwise direction and the other arm rotating in a counter-clockwise direction upon rotation into the deployed position.

14. The cable slack manager of claim 10, wherein the two or more spaced apart cable management members are C-shaped.

15. The cable slack manager of claim 10, wherein the two or more spaced apart cable management members comprise a leading slack management member comprising a rounded portion and extending circumferentially about 360 degrees and two or more successively spaced trailing slack management members extending circumferentially about 180 degrees, wherein the leading slack management member is positioned closer to the hinge than the trailing slack management members.

16. The cable slack manager of claim 10, wherein the hinge comprises a pin positionable within an aperture.

17. The cable slack manager of claim 10, wherein the guide comprises opposing guide members, each of which extends from a first end to a second end, with a curvilinear surface interposed therebetween.

18. The cable slack manager of claim 10, wherein the positioning of the guide limits translational movement of cable slack to between about 0.05 inches to about 0.5 inches upon rotation of the at least one arm.

19. The cable slack manager of claim 10, wherein the cable slack manager is dimensioned to occupy no more than one rack mounting unit on the cable management assembly.

20. The cable slack manager of claim 10, further comprising a base mountable to the cable management assembly, the base for carrying the at least one arm.

21. A cable slack manager for use with a cable management assembly, the cable slack manager comprising:
  at least one arm comprising a first portion and second portion rotatably secured to the cable management assembly, the first portion defined by opposing external edges of said at least one arm, said opposing edges positioned in a parallel relationship and said at least one arm rotatable between a first position and a second position about an axis of rotation transverse to the at least one arm, said first portion comprising a length dimension and a width dimension, said length dimension greater than said width dimension and said width dimension extending between said opposing parallel sides;
  a leading slack management member comprising a rounded portion and extending circumferentially about 360 degrees, the leading slack management member positioned on the at least one arm; and
  two or more successively spaced C-shaped trailing slack management members defining openings between adjacent cable slack management members, with cable slack extendable through the openings and windable about the C-shaped trailing slack management members, the C-shaped trailing slack management members positioned on the at least one arm in alignment with and spaced apart relation to the leading slack management member, wherein each of said leading and successively spaced C-shaped trailing slack management members extend across substantially the entire width dimension of said first portion and wherein the leading slack management member is positioned closer to the hinge than the trailing slack management members and the leading and trailing slack management members are each positioned along a longitudinal axis bisecting the opposing external edges and running the length dimension of the first portion of the at least one arm.

22. The cable slack manager of claim 21, further comprising a base comprising a mounting flange for releasable securement of the base to the cable management assembly, the base carrying the at least one arm.

23. The cable slack manager of claim 21 comprising opposing arms dimensioned so that each arm can rotate without contacting the other.

24. The cable slack manager of claim 21, wherein the at least one arm is rotatable between a stored position, with the two or more cable slack management members inaccessible to a user, and a deployed position, with the two or more cable slack management members accessible to the user.

25. The cable slack manager of claim 24 comprising opposing arms positioned such that each arm rotates in opposite directions during rotation, with one arm rotating in a clockwise direction and the other arm rotating in a counter-clockwise direction upon rotation into the deployed position.

26. The cable slack manager of claim 21, wherein the hinge comprises a pin positionable within an aperture.

27. The cable slack manager of claim 21, further comprising a guide positioned on the at least one arm.

28. The cable slack manager of claim 27, wherein the guide is positioned to limit translational movement of cable slack to between about 0.05 inches to about 0.5 inches upon rotation of the at least one arm.

29. The cable slack manager of claim 27, wherein the guide comprises opposing guide members, each of which extend from a first end to a second end, with a curvilinear surface interposed therebetween, the curvilinear surfaces for guiding cable slack.

30. The cable slack manager of claim 21, wherein the manager is dimensioned to occupy no more than one rack mounting unit on the cable management assembly.

31. The cable slack manager of claim 21, wherein the C-shaped trailing slack management members each comprise first and second forward facing surfaces spaced apart and connected by a curvilinear surface, with a core-out defined between the first and second forward facing surfaces and the curvilinear surface.

* * * * *